United States Patent
Al-Amoudi et al.

(10) Patent No.: US 10,538,916 B1
(45) Date of Patent: Jan. 21, 2020

(54) THERMAL INSULATING MASONRY HOLLOW BRICKS

(71) Applicant: King Fahd University of Petroleum and Minerals, Dhahran (SA)

(72) Inventors: Omar Saeed M. Baghabra Al-Amoudi, Dhahran (SA); Mohammed Ali Mohammed Al-Osta, Dhahran (SA); Ahmed Salem Bark Al-Tamimi, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 16/022,071

(22) Filed: Jun. 28, 2018

(51) Int. Cl.
| | |
|---|---|
| *E04C 1/00* | (2006.01) |
| *E04C 1/41* | (2006.01) |
| *E04B 1/78* | (2006.01) |
| *C04B 16/06* | (2006.01) |
| *C04B 14/18* | (2006.01) |
| *C04B 18/22* | (2006.01) |
| *E04B 2/02* | (2006.01) |

(52) U.S. Cl.
CPC ................ *E04C 1/41* (2013.01); *C04B 14/18* (2013.01); *C04B 16/0625* (2013.01); *C04B 18/22* (2013.01); *E04B 1/78* (2013.01); *C04B 2201/20* (2013.01); *C04B 2201/30* (2013.01); *E04B 2002/0206* (2013.01); *E04B 2002/0293* (2013.01)

(58) Field of Classification Search
CPC ... C04B 28/04; C04B 14/041; C04B 2201/52; E04C 1/41; E04C 1/397; E04C 1/00
USPC .......................................................... 52/606
See application file for complete search history.

(56) References Cited

U.S. PATENT DOCUMENTS

| | | | | | |
|---|---|---|---|---|---|
| 2,319,203 | A | * | 5/1943 | Branham | ................... E04B 2/20 52/605 |
| 4,123,881 | A | * | 11/1978 | Muse | ........................ E04B 2/44 52/100 |
| 4,148,166 | A | * | 4/1979 | Toone | ........................ E04B 2/44 52/270 |
| 4,319,440 | A | * | 3/1982 | Rassias | ..................... E04B 2/52 52/438 |
| 5,177,924 | A | * | 1/1993 | Kakuk | ...................... E04C 2/16 52/606 |
| 6,588,168 | B2 | * | 7/2003 | Walters | ..................... E04B 2/14 52/604 |
| 6,596,208 | B1 | * | 7/2003 | Glick | ........................ B29B 7/16 264/109 |

(Continued)

FOREIGN PATENT DOCUMENTS

| | | |
|---|---|---|
| CN | 101508552 A | 8/2009 |
| CN | 202850332 U | 4/2013 |

(Continued)

*Primary Examiner* — Beth A Stephan
(74) *Attorney, Agent, or Firm* — Oblon, McClelland, Maier & Neustadt, L.L.P.

(57) ABSTRACT

Lightweight masonry hollow bricks of a substantially rectangular cuboid shape having central cavities and side indentations. A concrete composition of the masonry hollow bricks includes cement, water, sand, a coarse aggregate, and an insulating material, e.g. perlite, polyethylene, crumb rubber. The developed masonry hollow bricks met the ASTM requirements for non-load bearing masonry bricks in addition to satisfying the ASTM standard as being lightweight masonry bricks.

18 Claims, 9 Drawing Sheets

(56) References Cited

U.S. PATENT DOCUMENTS

| | | | | |
|---|---|---|---|---|
| 6,799,405 | B2* | 10/2004 | Gilbert | E04B 2/46 |
| | | | | 52/592.6 |
| 9,822,529 | B1* | 11/2017 | Al-Salloum | E04C 1/41 |
| 2002/0112427 | A1* | 8/2002 | Baldwin | E04B 2/42 |
| | | | | 52/309.4 |
| 2006/0037815 | A1* | 2/2006 | Schabel, Jr. | B60R 13/08 |
| | | | | 181/290 |
| 2007/0248804 | A1* | 10/2007 | Kudrick | B28B 7/0044 |
| | | | | 428/292.1 |
| 2009/0178590 | A1* | 7/2009 | Mitchell | B28B 23/024 |
| | | | | 106/644 |
| 2013/0276400 | A1* | 10/2013 | Genest | E04C 1/00 |
| | | | | 52/600 |
| 2017/0058519 | A1* | 3/2017 | Foderberg | E04C 2/049 |
| 2017/0145690 | A1* | 5/2017 | Genest | E04B 2/46 |
| 2017/0283319 | A1* | 10/2017 | Maslehuddin | C04B 28/04 |
| 2018/0222798 | A1* | 8/2018 | Ibrahim | C04B 28/04 |

FOREIGN PATENT DOCUMENTS

| | | |
|---|---|---|
| CN | 203188435 U | 9/2013 |
| CN | 103437480 A | 12/2013 |
| CN | 204023871 U | 12/2014 |

* cited by examiner

3-D

Crushed Tires Rubber (CTR)

Pass #3/16
< 4.76 mm

Crushed Tires Rubber (CTR)

Pass #3/8
< 9.52 mm

High Density Polyethylene (HDPE)

Pass #3/16

< 4.76 mm

High Density Polyethylene (HDPE)

Pass #3/8

< 9.52 mm

Graded Perlite (GPL)

THERMAL INSULATING MASONRY HOLLOW BRICKS

BACKGROUND OF THE INVENTION

Technical Field

The present invention is concerned with a lightweight masonry hollow brick having a substantially rectangular cuboid shape with central cavities and side indentations. The masonry hollow brick contains insulating materials such as perlite, polyethylene and/or crumb rubber.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Thermally efficient masonry bricks play a crucial role in reducing electricity consumption needed to maintain a desired "comfort" temperature within a building. Heat transfer through masonry bricks may be reduced by partially replacing fine aggregates and/or coarse aggregates of the masonry bricks with insulating materials. Additionally, an effective structural design of masonry hollow bricks may contribute to the reduction of heat transfer through the bricks.

In view of the forgoing, one objective of the present disclosure is to provide an insulating masonry hollow brick formed from a concrete mixture containing cement, water, sand, and a coarse aggregate, in addition to an insulating material such as perlite, polyethylene, and crumb rubber. The masonry hollow brick may be of a substantially rectangular cuboid shape having central cavities and side indentations. The insulating masonry hollow brick provides substantially improved insulation properties while satisfying the strength requirements described in ASTM C 129.

BRIEF SUMMARY OF THE INVENTION

According to a first aspect, the present disclosure relates to a masonry hollow brick of a substantially rectangular cuboid shape involving first and second outer central cavities having rectangular cross sections parallel to a rectangular cross section of the masonry hollow brick, an inner central cavity having a rectangular cross section that is placed between and parallel with the first and second outer central cavities, and first and second rectangular side indentations having cross sections extending from a sidewall of the masonry hollow brick toward the inner central cavity. The inner central cavity and the first or the second side indentations are not continuous. The first and second outer central cavities, the inner central cavity, and the first and second side indentations are continuous along a direction perpendicular to the cross section of the masonry hollow brick. The masonry hollow brick is a cured form of a concrete composition containing (i) cement, (ii) water, (iii) sand, (iv) an insulating material which is at least one selected from the group consisting of a perlite, a polyethylene, and a crumb rubber, and (v) a coarse aggregate, which is not the insulating material.

In one embodiment, the rectangular cross section of the inner central cavity has a length that is shorter than the rectangular cross sections of the first and second outer central cavities.

In one embodiment, the length of each of the first and second rectangular side indentations is 12-18% relative to that of the rectangular cross section of the masonry hollow brick, the length of each of the rectangular cross sections of the first and second outer central cavities is 82-90% relative to that of the masonry hollow brick, and the length of the rectangular cross section of the inner central cavity is 45-65% relative to that of the masonry hollow brick.

In one embodiment, the first and second outer central cavities have an aspect ratio of 1.7-2.2, the inner central cavity has an aspect ratio of 1-1.4, the first and second rectangular side indentations have an aspect ratio of 0.1-0.5, and the masonry hollow brick has a hollow ratio of 20%-40%. Each aspect ratio is determined by comparing the lengths of the rectangular cross sections of the cavities or the lengths of rectangular side indentations to the height of the substantially rectangular cuboid shape of the masonry hollow brick.

In one embodiment, the concrete composition contains: (i) 10-25 wt % of the cement, (ii) 5-20 wt % of the water, (iii) 14-25 wt % of the sand, (iv) 5-15 wt % of the insulating material, and (v) 30-50 wt % of the coarse aggregate relative to a total weight of the concrete composition.

In one embodiment, the coarse aggregate has a particle size of 3-12 mm.

In one embodiment, the graded perlite is present as the insulating material, and the graded perlite is in the form of fine particles having a particle size of 0.1-6 mm.

In one embodiment, the polyethylene is present as the insulating material, and the polyethylene is in the form of coarse particles having a particle size of 3-12 mm.

In one embodiment, the polyethylene is a high density polyethylene.

In one embodiment, the crumb rubber is present as the insulating material, and the crumb rubber is in the form of coarse particles having a particle size of 3-12 mm.

In one embodiment, the perlite is present as the insulating material, and the perlite is in the form of fine particles having a particle size of 0.1-6 mm, and a weight ratio of the sand to the graded perlite ranges from 2:1 to 4:1.

In one embodiment, the polyethylene is present as the insulating material, and the polyethylene is in the form of coarse particles having a particle size of 3-12 mm, and a weight ratio of the coarse aggregate to the polyethylene ranges from 3:1 to 5:1.

In one embodiment, the crumb rubber is present as the insulating material, and the crumb rubber is in the form of coarse particles having a particle size of 3-12 mm, and a weight ratio of the coarse aggregate to the crumb rubber ranges from 3:1 to 5:1.

In one embodiment, the coarse aggregate has a specific gravity of 2-3.

In one embodiment, the concrete composition further comprises a superplasticizer.

In one embodiment, a weight ratio of the water to the cement ranges from 1:1 to 1:3.

In one embodiment, the masonry hollow brick has a compressive strength of 3.0-4.0 MPa as determined by ASTM C 140.

In one embodiment, the masonry hollow brick has a dry density of 1100-1700 kg/m$^3$.

In one embodiment, the masonry hollow brick has a water absorption of 80-200 kg/m$^3$ as determined by ASTM C140.

In one embodiment, the masonry hollow brick has a thermal conductivity of 0.2-0.45 W/m·K as determined by ASTM C 177-85.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanyingt drawings, wherein.

DETAILED DESCRIPTION OF THE EMBODIMENTS

Figure 1A:
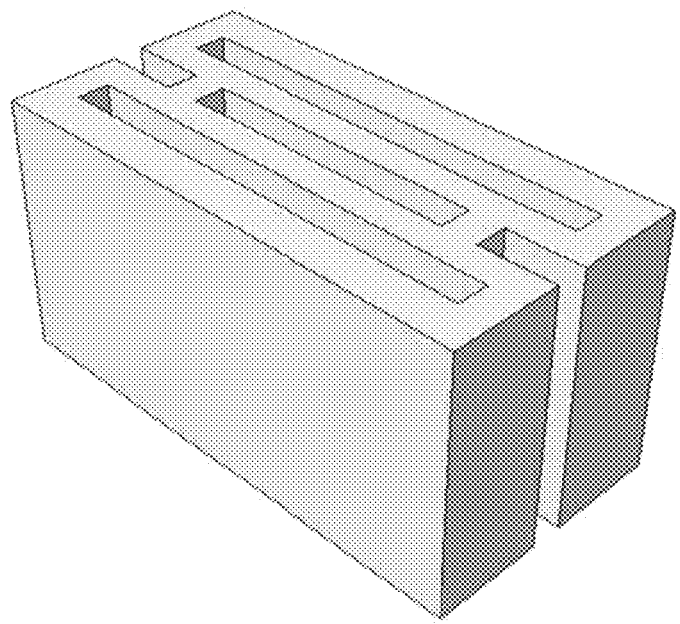
FIG. 1A illustrates a perspective view of an exemplary masonry hollow brick.
Figure 1B:
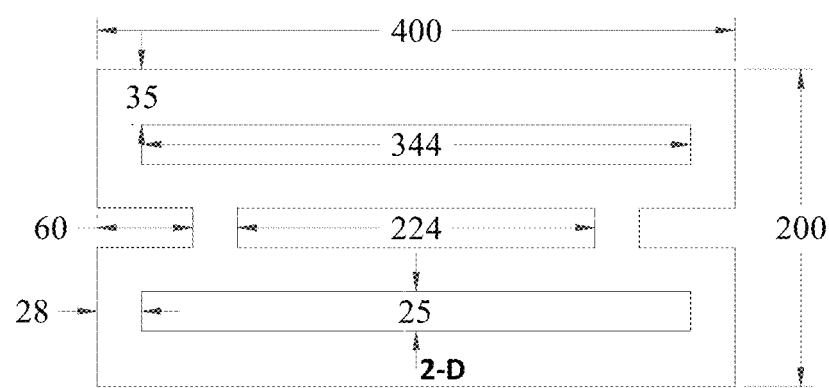
FIG. 1B illustrates a top cross section of the exemplary masonry hollow brick of FIG. 1A.

Embodiments of the present disclosure will now be described more fully hereinafter with reference to the accompanying drawings, in which some, but not all embodiments of the disclosure are shown.

As used herein, the words "a" and "an" and the like carry the meaning of "one or more." Within the description of this disclosure, where a numerical limit or range is stated, the endpoints are included unless stated otherwise. Also, all values and subranges within a numerical limit or range are specifically included as if explicitly written out.

According to a first aspect, the present disclosure relates to a masonry hollow brick of a substantially rectangular cuboid shape involving first and second outer central cavities having rectangular cross sections parallel to a rectangular cross section of the masonry hollow brick, an inner central cavity having a rectangular cross section that is disposed between and parallel with the first and second outer central cavities, and first and second rectangular side indentations having cross sections extending from a sidewall of the masonry hollow brick toward the inner central cavity. The inner central cavity and the first or the second side indentations are not continuous. The first and second outer central cavities, the inner central cavity, and the first and second side indentations are continuous along a direction perpendicular to the cross section of the masonry hollow brick, that is, these cavities and indentations extend all the way through the masonry hollow brick. An illustrative demonstration of the masonry hollow brick disclosed herein can be found in FIGS. 2A and 2B.

The masonry hollow brick is a cured form of a concrete composition containing (i) cement, (ii) water, (iii) sand, (iv) an insulating material which is at least one selected from the group consisting of a perlite, a polyethylene, and a crumb rubber, and (v) a coarse aggregate, which is not the insulating material. In one or more embodiments, the coarse aggregate has a particle size of 2-20 mm, preferably 3-15 mm, preferably 4-12 mm, preferably 5-9 mm.

In one or more embodiments, the concrete composition contains (i) 10-25 wt %, preferably 12-20 wt %, more preferably 15-18 wt % of the cement, (ii) 5-20 wt %, preferably 7-16 wt %, more preferably 9-12 wt % of the water, (iii) 14-25 wt %, preferably 17-23 wt %, more preferably 19-21 wt % of the sand, (iv) 5-15 wt %, preferably 8-14 wt %, more preferably 11-13 wt % of the insulating material, and (v) 30-50 wt %, preferably 35-48 wt %, more preferably 42-45 wt % of the coarse aggregate relative to a total weight of the concrete composition. In a preferred embodiment, the insulating material is at least one selected from the group consisting of a perlite, a polyethylene, and a crumb rubber.

As used herein, the term "concrete" refers to a composite material composed of cement, water and aggregates bonded together forming a concrete mixture, which hardens over time. In terms of the present disclosure, the concrete composition refers to a water-containing precursor of the masonry hollow brick, which is a precursor of the masonry hollow brick before hardening.

In a preferred embodiment, the concrete composition contains 10-25 wt % of the cement, preferably 12-20 wt %, preferably 15-18 wt % of the cement relative to a total weight of the concrete composition. As used herein, the term "cement" refers to a substance that sets and hardens and can bind other materials together. Any type of cement or cement containing material may be used in any of the embodiments disclosed herein. Exemplary cement may include Type I, Type IA, Type II, Type IIA, Type III, Type IIIa, Type IV, and Type V Portland cements (as recognized by either ASTM C 150 or European EN-197 standard), Portland fly ash cements, Portland pozzolan cements, Portland silica fume cements, masonry cements, EMC cements, stuccos, plastic cements, expansive cements, white blended cements, pozzolan-lime cements, slag-lime cements, supersulfated cements, calcium aluminate cements, calcium sulfoaluminate cements, geopolymer cements, Rosendale cements, a polymer cement mortar, a lime mortar, and/or a pozzolana mortar. In some embodiments, $SiO_2$ may be present in the cement. Alternatively, the cement may include $SiO_2$-containing materials including but not limited to belite ($2CaO.SiO_2$), alite ($3CaO.SiO_2$), celite ($3CaO.Al_2O_3$), or brownmillerite ($4CaO.Al_2O_3.Fe_2O_3$).

The cement, as used herein, may be a hydraulic cement, a non-hydraulic cement, or mixtures thereof. Non-hydraulic cement may not set in wet conditions or underwater; rather, it sets as it dries and reacts with carbon dioxide in the air and may be affected by some aggressive chemicals after setting. In contrast, hydraulic cement sets in the presence of water, e.g. in wet conditions or underwater. Preferably, the cement is a hydraulic cement, which sets when mixed with water through a complex series of chemical reactions. When the hydraulic cement is mixed with water, different constituents slowly crystallize and interlock forming crystals that give cement its strength. Therefore, at least a portion of water chemically reacts with the cement during curing. Also, carbon dioxide may slowly absorb to convert constituents, e.g. Portlandite [$Ca(OH)_2$], into soluble calcium carbonate. The cement may be set in a few hours and hardens over a period of weeks, after being mixed with water. These processes can vary widely depending on the cement used and curing conditions. Immersion of the cement in warm water, after initial setting, may speed up the curing. In some embodiments, gypsum may be added as an inhibitor to prevent flash setting. In principle, the strength continues to rise slowly as long as water is available for continued hydration and curing. In one or more embodiments, the concrete composition contains 5-20 wt % of water, preferably 6-18 wt %, preferably 7-16 wt %, preferably 8-14 wt %, preferably 9-12 wt % of water relative to the total weight of the concrete composition. In a preferred embodiment, a weight ratio of the water to the cement ranges from 2:1 to 1:4, preferably from 1:1 to 1:3, preferably from 1:1.5 to 1:2.5, or about 1:2. The water may be supplied from a natural source, such as aquifers, lakes, oceans, bays, rivers, creeks, and/or underground water resources. The water may be cleaned to remove harmful substances and filtered to remove large solids before mixed with the cement.

In a preferred embodiment, the concrete composition contains 15-25 wt % of the sand, preferably 17-23 wt %, preferably 19-21 wt % of the sand relative to the total weight of the concrete composition. Sand is a naturally occurring granular material composed of finely divided rock and mineral particles. The composition of sand may vary depending on the local rock sources and geological conditions, but sand generally constitute silica (silicon dioxide, or $SiO_2$), for example, in the form of quartz. The sand preferably comprises 80-95 wt % of silicon dioxide, preferably 85-94 wt %, preferably 88-93 wt %, preferably 90-92 wt % of silicon dioxide relative to the total weight of the sand. The sand may contain calcium carbonate, for example, in the form of aragonite. The sand may also contain ferric oxide ($Fe_2O_3$), aluminum oxide ($Al_2O_3$), magnesium oxide (MgO), and potassium oxide ($K_2O$). These compounds may be present at a weight percent of less than 5 wt %, preferably less than 4 wt %, preferably less than 3 wt %, preferably 0.1-2.0 wt %, preferably 0.2-1.0 wt %, relative to the total weight of the sand. Other impurities may also be present in the sand including, but not limited to, limestone, gypsum, sand stone, feldspar, granite, magnetite, chlorite, glauconite, basalts, iron, obsidian, and mixtures thereof. Sand is finer than gravel and coarser than silt, and usually exists in a particulate form, e.g. grains having a diameter of from 0.0625 mm to 2 mm. In a preferred embodiment, the sand used herein is collected from sand dunes widely available in Saudi Arabia, which has an average particle size of less than 2 mm, preferably less than 1 mm, preferably 500-800 µm, preferably 600-700 µm. In one or more embodiments, the sand used herein has a specific gravity of 2-3, preferably 2.2-2.8, preferably 2.4-2.6, or about 2.55. As defined herein, the term "specific gravity" refers to a ratio of the weight of a volume of a substance to the weight of an equal volume of a reference substance, e.g. distilled water.

Aggregates used herein preferably refer to a broad category of particulate materials that are added as fillers to add strength to the masonry hollow brick of the present disclosure. The presence of aggregates may also increase durability of the masonry hollow brick and reduces its maintenance cost. Exemplary aggregates include gravel, rocks, natural soil, quarried crushed mineral aggregates from igneous, metamorphic or sedimentary rocks, including unused and waste aggregates from quarry operations, gravel, dredged aggregates, China clay stent, China clay wastes, natural stone, recycled bituminous pavements, recycled concrete pavements, reclaimed road base and subbase materials, crushed bricks, construction and demolition wastes, crushed recycled concrete (e.g. aggregates from construction, demolition, and excavation waste), waste/recycled flue gas ashes, crushed glass, slate waste, egg shells, sea shells, and mixtures thereof.

As used herein, aggregates may be classified as "fine aggregates" and "coarse aggregates" based upon an average particle size of the aggregates according to ASTM C 330. The term "average particle size" refers to the longest linear dimension of the particle. In terms of the present disclosure, "fine aggregates" refer to aggregates with an average particle size of less than or equal to 2 mm, preferably less than 900 µm, preferably less than 800 µm, preferably less than 750 µm, preferably in the range of 100-700 µm, preferably 200-650 µm, preferably 250-600 µm. In terms of the present disclosure, a "coarse aggregate" refers to an aggregate with an average particle size of greater than 4.75 mm, preferably of 5-10 mm.

In a preferred embodiment, the concrete composition contains 30-50 wt % of the coarse aggregate, preferably 35-48 wt %, preferably 40-46 wt %, preferably 42-45 wt % of the coarse aggregate relative to the total weight of the concrete composition. In one or more embodiments, the concrete composition contains coarse aggregates with an average particle size of 2-20 mm, preferably 3-15 mm, preferably 4-12 mm, preferably 5-9 mm. In certain embodiments, coarse aggregates of at least two different average particles sizes are present in the concrete composition. For example, coarse aggregates having average particle sizes of 2-5 mm and 6-10 mm may be present in the concrete composition at a weight ratio of 1:5 to 1:2, preferably 1:4 to 1:3, or about 3:10. The coarse aggregates used herein may be obtained from aforementioned exemplary aggregates through crushing, grinding, pulverizing, etc. to achieve desired average particle sizes. In a preferred embodiment, the coarse aggregates used herein are limestone. In one or more embodiments, the coarse aggregates have a specific gravity of 1.8-3.2, preferably 2-3.0, preferably 2.2-2.8, preferably 2.4-2.6. In certain embodiments, a lightweight coarse aggregate may also be used.

In a preferred embodiment, the concrete composition contains 5-20 wt % of the insulating material, preferably 6-19 wt %, preferably 7-18 wt %, preferably 8-17 wt %, preferably 9-16 wt %, preferably 10-15 wt %, preferably 11-14 wt %, preferably 12-13 wt % of the insulating material relative to the total weight of the concrete composition. The insulating material may be at least one selected from the group consisting of a perlite, a polyethylene, and a crumb rubber.

In one or more embodiments, the perlite is present as the insulating material. In a preferred embodiment, when perlite is present as the insulating material, a weight ratio of the sand to the graded perlite ranges from 1:1 to 6:1, preferably 2:1 to 5:1, preferably 3:1 to 4:1. As used herein, perlite refers to a naturally occurring amorphous volcanic glass with a relatively high water content, typically formed by the hydration of obsidian. Perlite mineral expands when subjected to heat and forms expanded perlite. Perlite softens when heated to temperatures of 800-900° C. Water trapped in the structure of perlite vaporizes, thus expanding the material to 7-16 times its original volume. An unexpanded ("raw") perlite has a bulk density around 1100 kg/m$^3$, while a typical expanded perlite has a bulk density of about 30-150 kg/m$^3$. The perlite of the present disclosure may be an unexpanded perlite, an expanded perlite, or mixtures thereof. In a preferred embodiment, the perlite is an expanded perlite. The perlite may comprise 65-80 wt % of $SiO_2$, preferably 70-75 wt % of $SiO_2$; 10-18 wt % of $Al_2O_3$, preferably 12-15 wt % of $Al_2O_3$; 2-5 wt % of $Na_2O$, preferably 3-4 wt % of $Na_2O$; and 2-6 wt % of $K_2O$, preferably 3-5 wt % of $K_2O$, with each weight percent being relative to the total weight of the perlite. In certain embodiments, the perlite may further contain various elements including, but not limited to, calcium, iron, magnesium, and oxides thereof in less than 2 wt %, preferably less than 1 wt % relative to the total weight of the perlite. Exemplary expanded perlites useful as an insulating material in the presently disclosed masonry hollow brick include, without limitation, shattered fragment perlite, individual spherical cell perlite, open-surfaced expanded perlite, and smooth-surfaced expanded perlite. In a preferred embodiment, the perlite is in the form of fine particles having an average particle size of 0.1-6 mm, preferably 0.15-2.5 mm, preferably 0.3-2 mm, preferably 0.6-1.5 mm, preferably 0.8-1.2 mm.

In one or more embodiments, the polyethylene is present as the insulating material. In a preferred embodiment, when the polyethylene is present as the insulating material, a weight ratio of the coarse aggregate to the polyethylene ranges from 2:1 to 6:1, preferably 3:1 to 5:1, or about 4:1. In one or more embodiments, the polyethylene used herein is in the form of coarse particles having an average particle size of 2-20 mm, preferably 3-18 mm, preferably 4-12 mm, preferably 5-9 mm. In certain embodiments, polyethylene of at least two different average particle sizes is present as the insulating material in the concrete composition. For example, polyethylene having average particle sizes of 2-5 mm and 6-10 mm may be present in the concrete composition at a weight ratio of 1:5 to 1:2, preferably 1:4 to 1:3, or about 3:10. The polyethylene present as the insulating material of the present disclosure may have an average molecular weight of 2-5000 kDa, preferably 5-4000 kDa, preferably 10-3000 kDa, preferably 100-2000 kDa, preferably 200-1000 kDa, preferably 300-900 kDa, preferably 400-800 kDa, preferably 500-700 kDa. In a preferred embodiment, the polyethylene used herein is a high density polyethylene. In an alternative embodiment, the polyethylene used herein is a low density polyethylene and/or a linear low density polyethylene. The aforementioned polyethylenes may be present as the insulating material in the form of beads. Alternatively, the polyethylenes in forms such as strands, fibers, flakes may be present as the insulating material.

Exemplary polymeric materials that may be used in addition to, or in lieu of the polyethylene of the present disclosure include, but are not limited to, polystyrene, high impact polystyrene, polypropylene (PP), polyvinyl chloride (PVC), polyvinylidene chloride, polyamide (PA), polyacrylonitrile, acrylonitrile butadiene styrene, polyethylene/acrylonitrile butadiene styrene, polycarbonate/acrylonitrile butadiene styrene, acrylic polymers, polybutadiene, polyisoprene, polyacetylene, silicones, and mixtures thereof.

In one or more embodiments, the crumb rubber is present as the insulating material. In a preferred embodiment, when the crumb rubber is present as the insulating material, a weight ratio of the coarse aggregate to the crumb rubber ranges from 2:1 to 6:1, preferably 3:1 to 5:1, or about 4:1. The crumb rubber used herein may be retrieved from recycled tires that are ground to about the size of a lump of coal. Thereafter these nuggets are ground down to about walnut size, with further grinding techniques bringing the walnut size bits of rubber down to mesh size then to a lower mesh size. In one embodiment, the crumb rubber is a thermoset or thermoplastic polymer in the form of crushed tire rubber obtained from automotive and/or truck scrap tires after being processed. In one or more embodiments, the crumb rubber used herein is in the form of coarse particles having a particle size of 2-20 mm, preferably 3-18 mm, preferably 4-12 mm, preferably 5-9 mm. In certain embodiments, crumb rubber of at least two different average particle sizes is present as the insulating material in the concrete composition. For example, crumb rubber having average particle sizes of 2-5 mm and 6-10 mm may be present in the concrete composition at a weight ratio of 1:10 to 1:2, preferably 1:5 to 1:3, or about 3:10.

In certain embodiments, the insulating material of the present disclosure, e.g. perlite, polyethylene, crumb rubber, are treated with a surface treatment agent such as hydrogen peroxide to form treated insulating material that may have more carboxylic functionalities than untreated insulating material. The functional groups in the concrete composition containing water, cement, and coarse aggregates may interact with the carboxylic functionalities, thereby leading the treated insulating material to contact with and be suspended in the concrete composition to a much greater degree than untreated insulating material. The insulating material may be treated by mixing it with hydrogen peroxide to form a mixture at a temperature of at least 30° C., preferably at least 40° C., preferably about 50-85° C., preferably about 60-70° C. while stirring for about 0.1-1 hour, preferably about 0.2-0.5 hour. The hydrogen peroxide may have a concentration of 0.01-0.1 mM, preferably 0.02-0.05 mM relative to a total volume of the mixture.

In one or more embodiments, the concrete composition further comprises a superplasticizer. In a preferred embodiment, the concrete composition contains 0.05-0.5 wt %, preferably 0.1-0.4 wt %, preferably 0.2-0.3 wt % of the superplasticizer relative to the total weight of the concrete composition. As used herein, a "plasticizer" is an additive that increases the plasticity or fluidity of slurry. Plasticizers increase the workability of "fresh" concrete, allowing it to be placed and compacted more easily, with less consolidating effort. A superplasticizer is a plasticizer with fewer deleterious effects. A "superplasticizer" refers a chemical admixture used herein to provide a well-dispersed particle suspension in the concrete composition. The superplasticizer may be used to prevent particle segregation and to improve the flow characteristics of the concrete composition. The addition of a superplasticizer to the concrete composition may allow reducing the water to cement ratio without affecting the workability of the concrete composition, which may lead to improved hardening performance, strength, and durability of the masonry hollow brick.

In one embodiment, the superplasticizer is a polycarboxylate, e.g. a polycarboxylate derivative with polyethylene oxide side chains, a polycarboxylate ether (PCE) superplasticizer, such as the commercially available Glenium 51®. Polycarboxylate ether-based superplasticizers may allow a significant water reduction at a relatively low dosage, thereby providing good particle dispersion in the concrete composition. Polycarboxylate ether-based superplasticizers are composed of a methoxy-polyethylene glycol copolymer (side chain) grafted with methacrylic acid copolymer (main chain). Exemplary superplasticizers that may be used in addition to, or in lieu of a polycarboxylate ether based superplasticizer include, but are not limited to, alkyl citrates, sulfonated naphthalene, sulfonated alene, sulfonated melamine, lignosulfonates, calcium lignosulfonate, naphthalene lignosulfonate, polynaphthalenesulfonates, formaldehyde, sulfonated naphthalene formaldehyde condensate, acetone formaldehyde condensate, polymelaminesulfonates, sulfonated melamine formaldehyde condensate, polycarbonate, other polycarboxylates, other polycarboxylate derivatives comprising polyethylene oxide side chains, and the like and mixtures thereof.

Additional chemical admixtures may also present in the concrete composition. The chemical admixtures may be mixed with the concrete composition in the form of powder or fluids to give certain characteristics to the concrete composition that are not obtainable without using them. Exemplary additional chemical admixtures that may be used herein include, but are not limited to, accelerators, retarders, pigments, bonding agents, pumping aids and the like. As used herein, accelerators refer to chemical admixtures that speed up the hydration (hardening) of a concrete and may be useful for modifying the properties of concrete in cold weather. Exemplary accelerators include, but are not limited to, $CaCl_2$, $Ca(NO_3)_2$, and $NaNO_3$. As used herein, retarders, e.g. polyol retarders, refer to chemical admixtures that slow the hydration of a concrete and may be used in large-scale pours where partial hardening may be unavoidable without the presence of a retarder. Exemplary retarders include, without limitation, sugar, sucrose, sodium gluconate, glucose, citric acid, tartaric acid and the like. Pigments may be used to change the color of the concrete for aesthetic appeal. Bonding agents (typically a polymer) may be used to create a bond between old and new concrete with wide temperature tolerance and corrosion resistance. Pumping aids may be used to improve pumpability, thicken the concrete composition and reduce separation and bleeding.

As used herein, the presently disclosed "masonry brick" may refer to masonry blocks which are large units typically used in foundation walls and the like. The "masonry brick" described herein may also refer to bricks commonly used for buildings (particularly for external veneer), chimneys, furnaces, and the like. These bricks/blocks may have hollow passages for light weight and/or for insulation purposes.

The aforementioned concrete composition may be prepared by sequentially pouring different components into a concrete mixer. For example, the cement, sand, coarse aggregate and the insulating material are dry-mixed in a concrete drum mixer for a time period ranging from 30 seconds-10 minutes, 45 seconds-8 minutes, or 50 seconds-5 minutes. Preferably, mixing the cement, sand, coarse aggregate and the insulating material forms a dry mixture in which the insulating material is homogeneously dispersed. Following the dry mixing process, water is added to the dry mixture. The water is slowly poured into the concrete mixer while the concrete mixer turns the cement, sand, coarse aggregate and the insulating material for a time period ranging from 1-10 minutes, 2-8 minutes, or 3-6 minutes thereby forming a wet concrete mixture. Preferably, the water is mixed into the dry mixture for a time period of about 3 minutes. After a thorough mixing, the superplasticizer may be slowly poured into the concrete mixer, and the wet concrete mixture is further mixed for a time period of 1-10 minutes, 2-8 minutes, or 3-6 minutes thereby forming the concrete composition. The concrete composition containing the cement, sand, coarse aggregate, the insulating material, water, and the superplasticizer may be then fed into a steel mold to create a masonry brick after curing. The fresh concrete composition is compacted in the mold by using a steel rod or a trowel. After setting into the mold, the concrete composition may be air cured for a time period of 1-24 hours, 2-12 hours, or 4-8 hours and then removed from the mold, which results in a masonry brick. The masonry brick may be further water cured for a time period of 5-30 days, preferably 7-21 days at a temperature of 20-40° C., 24-35° C. or 28-32° C. Methods of preparing and curing concrete mixtures are generally known to those skilled in the art.

Figure 2A:
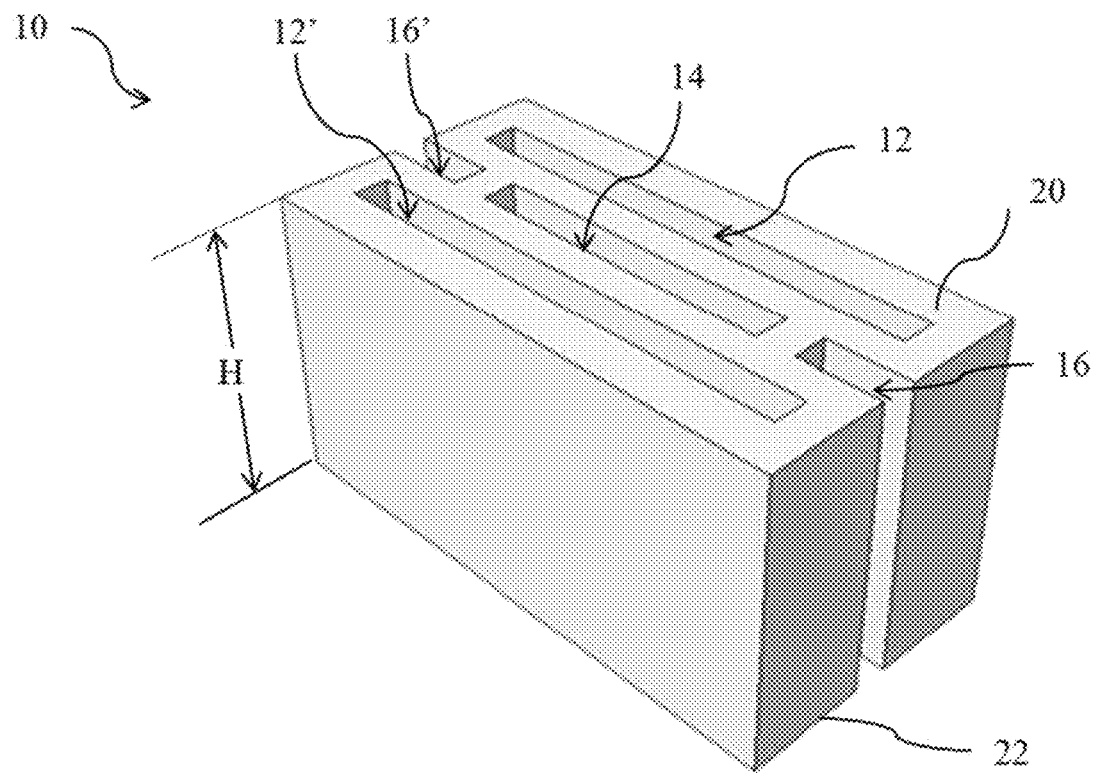
FIG. 2A is a perspective view of a masonry hollow brick.

The concrete composition may be used to produce masonry bricks in various shapes, e.g. rectilinear, rectangular, cylindrical, conical, and pyramidal. Referring first to FIG. 2A, the concrete composition described in the present disclosure is used to produce a hollow masonry brick 10 of a substantially rectangular cuboid shape having a height (H) and involving first and second outer central cavities 12 and 12', an inner central cavity 14 and first and second rectangular side indentations 16 and 16'. In a preferred embodiment, the masonry hollow brick has a height (H) in a range of 50-800 mm, preferably 100-600 mm, preferably 125-400 mm, preferably 150-300 mm, or about 200 mm.

Preferably, the first and second outer central cavities 12 and 12' have rectangular cross sections parallel to the rectangular cross section of the masonry hollow brick 10. Preferably, the inner central cavity 14 has a rectangular cross section that is disposed between and parallel with the first and second outer central cavities 12 and 12'. Preferably, the first and second rectangular side indentations 16 and 16' have cross sections extending from a sidewall of the masonry hollow brick 10 toward the inner central cavity 14. In most embodiments, the inner central cavity 14 and the first (16) or the second indentations (16') are not continuous. The first and second outer central cavities 12 and 12', the inner central cavity 14, and the first and second side indentations 16 and 16' are continuous along a direction perpendicular to the cross section of the masonry hollow brick 10. Thus, a plurality of open passages (12, 12', 14, 16, and 16') transverse the substantially rectangular cuboid shape of the hollow brick, extending between an upper (20) and a lower (22) surface thereof. In certain embodiments, an insulating agent is inserted within at least one of the open passages (12, 12', 14, 16, and 16'). Any suitable material having high thermal insulation properties may be used as the insulating agent. Exemplary insulating agents include, but are not limited to, mineral wool, rock wool, glass wool, cellulose, polystyrene foam, polyurethane foam, cork, aerogels, and fumed silica. In a preferred embodiment, the open passages remain open, using air solely as insulating agent.

In a preferred embodiment, each cavity of the masonry hollow brick, e.g. the first and second outer central cavities, the inner central cavity, is separated from the adjacent cavity by an equal longitudinal distance of 40-20 mm, preferably 30-25 mm, or about 27.5 mm and centrally aligned with respect to the length of the masonry hollow brick. In another preferred embodiment, the center of the inner central cavity is longitudinally aligned with the centers of the side indentations, which are centrally aligned with respect to the width of the masonry hollow brick.

Figure 2B:
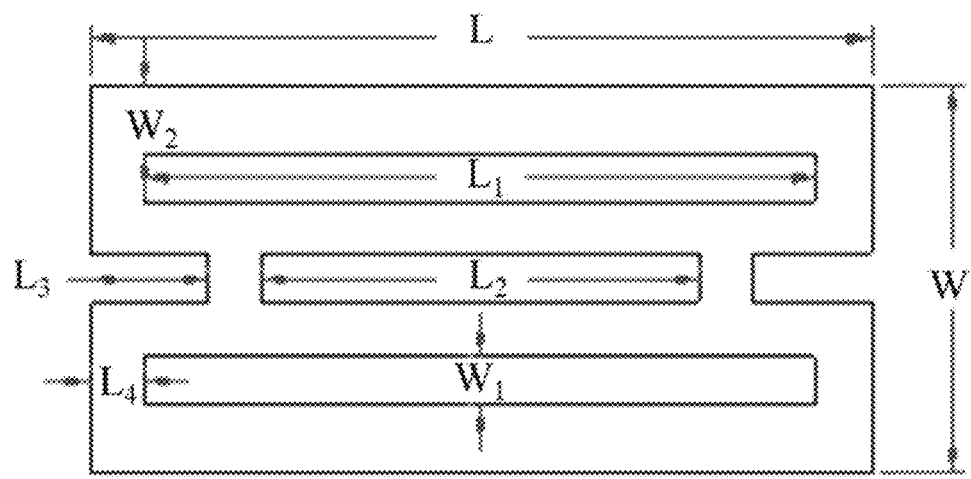
FIG. 2B is a top cross section of the masonry hollow brick of FIG. 2A.
Figure 3A:
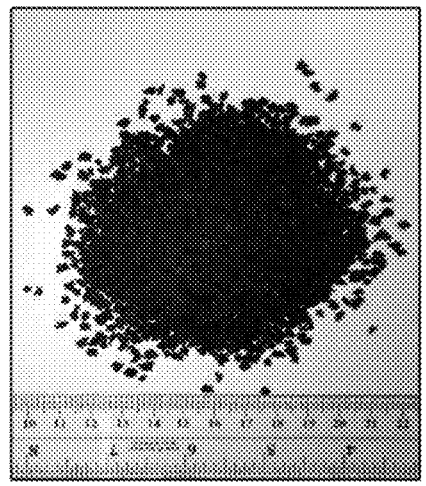
FIG. 3A is an image of crushed tire rubber having a particle size of 4.76 mm or less.
Figure 3B:
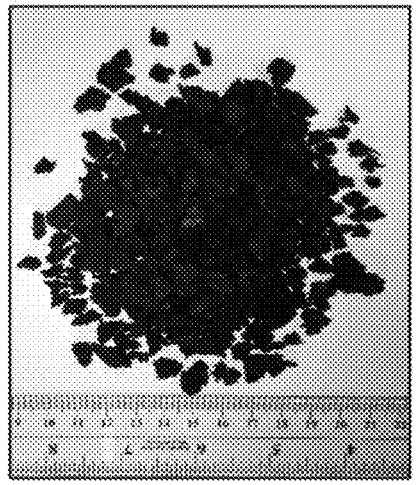
FIG. 3B is an image of crushed tire rubber having a particle size of 9.52 mm or less.
Figure 4A:
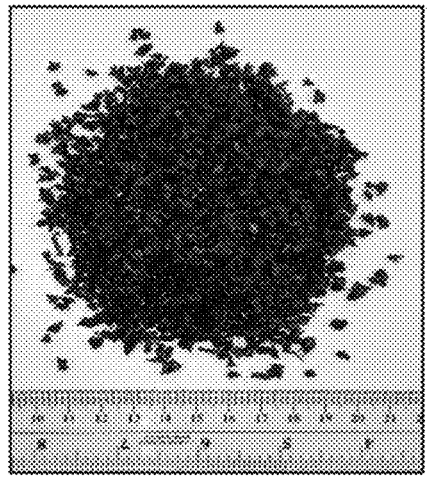
FIG. 4A is an image of high density polyethylene having a particle size of 4.76 mm or less.
Figure 4B:
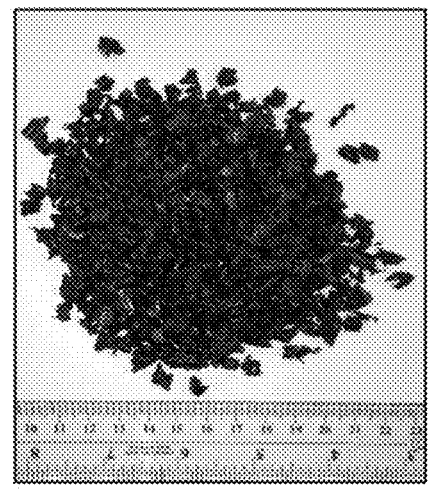
FIG. 4B is an image of high density polyethylene having a particle size of 9.52 mm or less.
Figure 5:
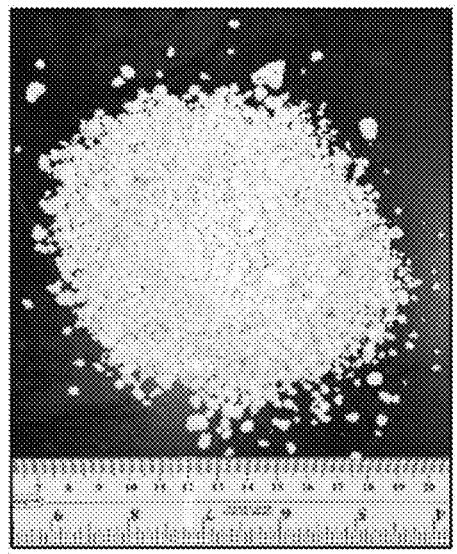
FIG. 5 is an image of perlite.
Figure 6:
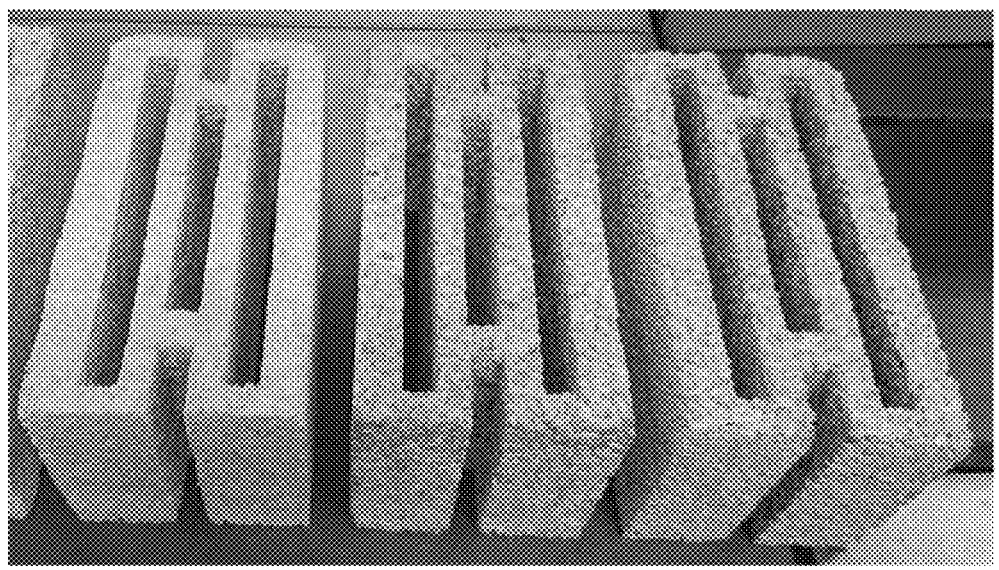
FIG. 6 is a picture showing masonry hollow bricks formed from concrete compositions containing perlite (GPLHB), crushed tire rubber (CTRHB), and high density polyethylene (HDPEHB), respectively, as the insulating material.
Figure 7A:
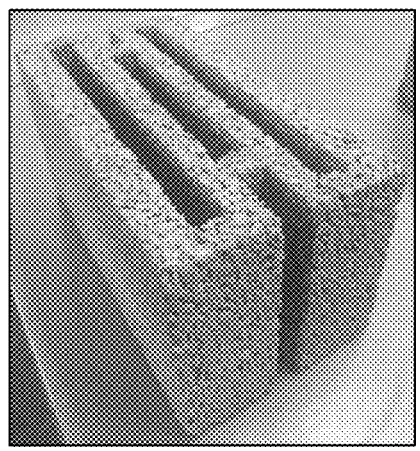
FIG. 7A is an image of a masonry hollow brick before conducting the compressive strength test.
Figure 7B:
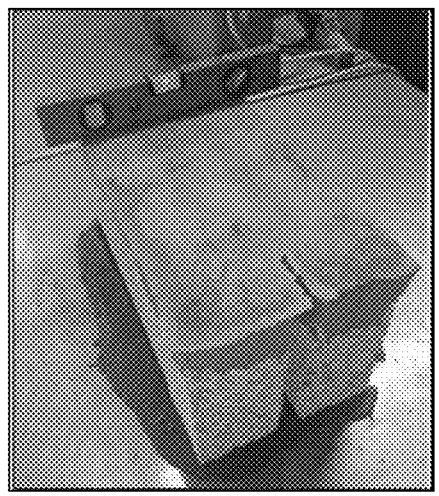
FIG. 7B is an image illustrating capping of the masonry hollow brick of FIG. 7A before the compressive strength test.
Figure 7C:
FIG. 7C is an image illustrating the compressive strength test of a masonry hollow brick.
Figure 8A:
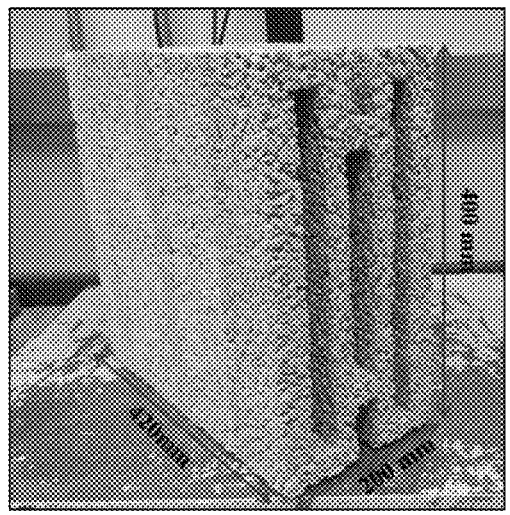
FIG. 8A is an image of a masonry hollow brick before an equivalent thermal conductive test.
Figure 8B:
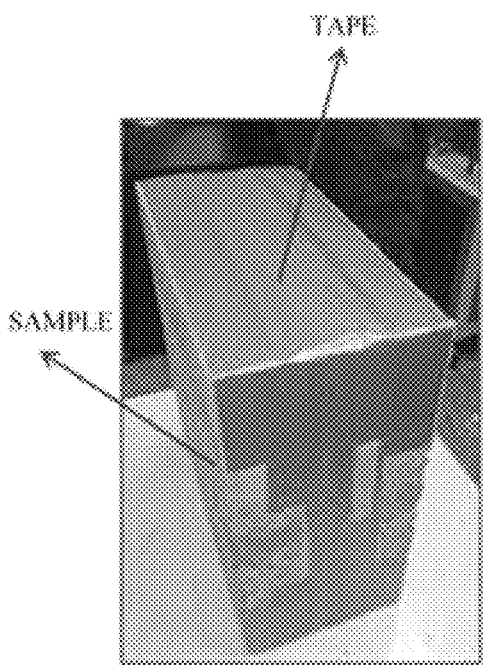
FIG. 8B illustrates the masonry hollow brick of FIG. 8A having its cavities covered by tape before the equivalent thermal conductive test.
Figure 8C:
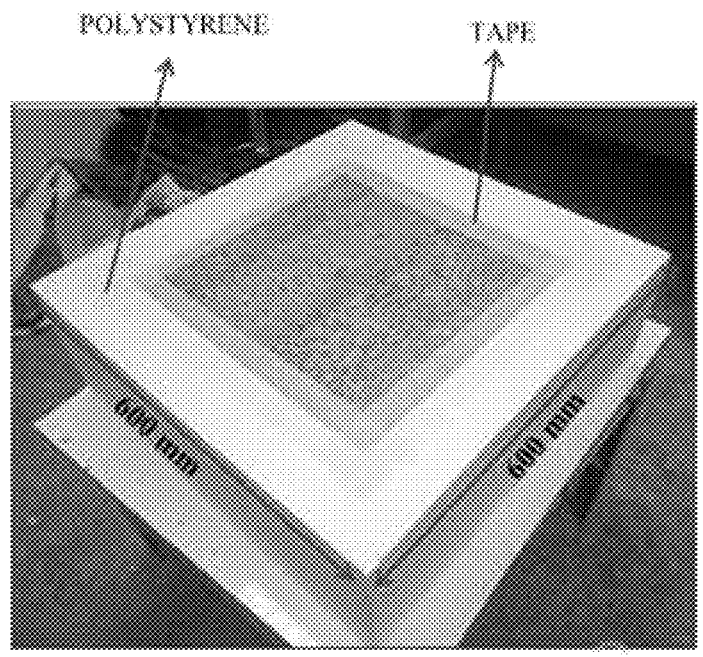
FIG. 8C illustrates the masonry hollow brick of FIG. 8A having its cavities covered by tape and polystyrene before conducting the equivalent thermal conductive test.
Figure 8D:
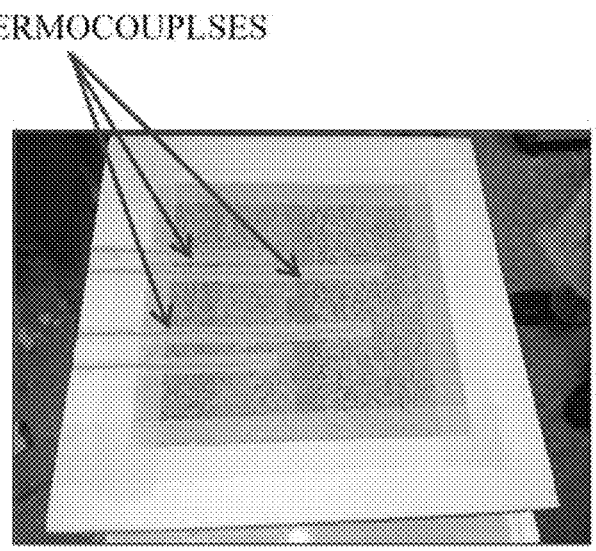
FIG. 8D shows the masonry hollow brick of FIG. 8C having thermocouples fixed on its surface before conducting the equivalent thermal conductive test.
Figure 8E:
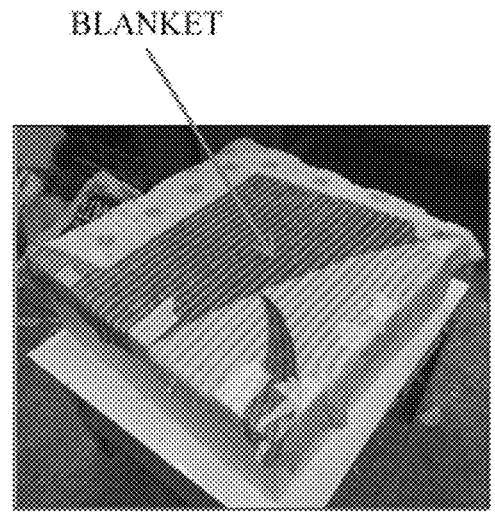
FIG. 8E shows covering the masonry hollow brick of FIG. 8D with a blanket before the equivalent thermal conductive test.
Figure 8F:
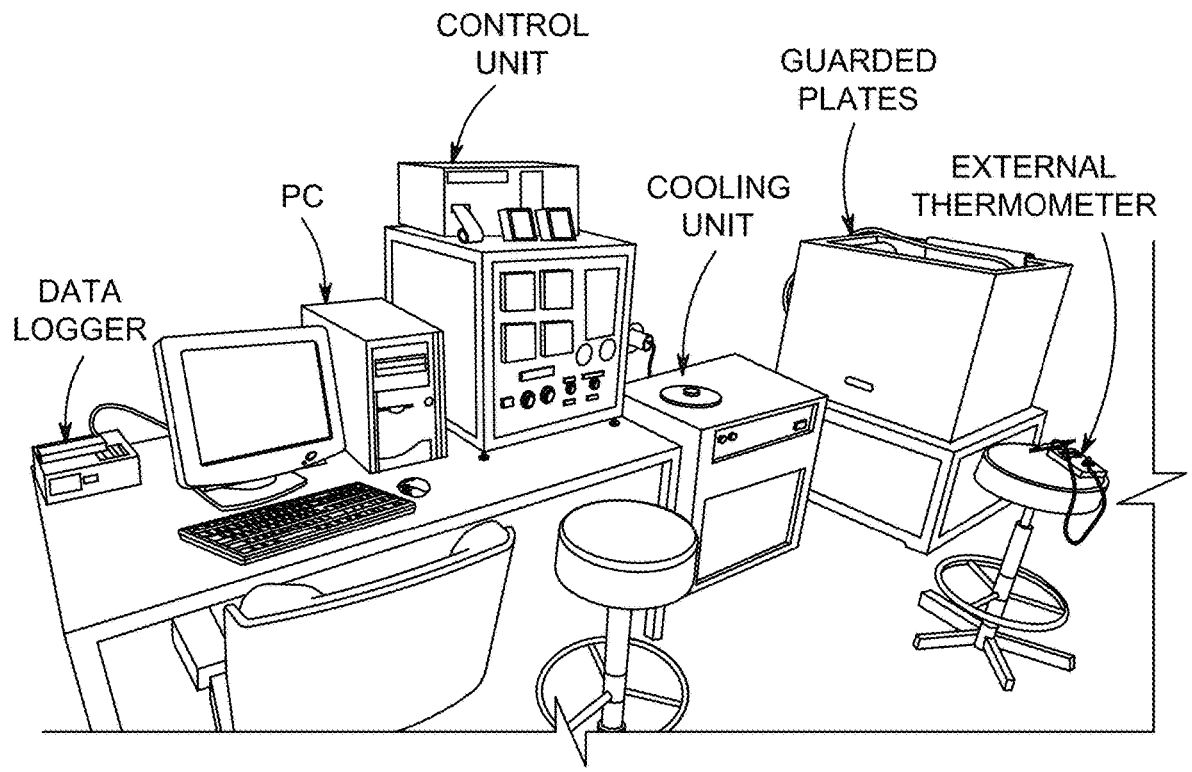
FIG. 8F is an image showing the instrumental setup for conducting the equivalent thermal conductive test on a masonry hollow brick.

Referring now to FIG. 2B, the rectangular cross section of the masonry hollow brick 10 has a length (L) of 100-1,000 mm, preferably 200-800 mm, preferably 250-600 mm, preferably 300-500 mm, or about 400 mm, and a width (W) of 50-500 mm, preferably 100-400 mm, preferably 125-300 mm, preferably 150-250 mm, or about 200 mm. Preferably, the rectangular cross sections of the first and second outer central cavities are of equivalent length ($L_1$) ranging from 75-700 mm, preferably 125-500 mm, preferably 150-300 mm, or about 344 mm, as well as equivalent width ($W_1$) ranging from 5-50 mm, preferably 10-40 mm, preferably 15-30 mm, or about 25 mm. Alternatively, the rectangular cross sections of the first and second outer central cavities have different lengths and/or widths. Preferably, the rectangular cross section of the inner central cavity has a length ($L_2$) of 50-500 mm, preferably 75-400 mm, preferably 125-300 mm, preferably 150-250 mm, or about 224 mm and a width of 5-50 mm, preferably 10-40 mm, preferably 15-30 mm, or about 25 mm. In a preferred embodiment, the length ($L_2$) of the rectangular cross section of the inner central cavity is shorter than the length ($L_1$) of the rectangular cross section of the first and second outer central cavities. Preferably, the cross sections of the first and second rectangular side indentations are of equivalent length ($L_3$) ranging from 20-125 mm, preferably 30-100 mm, preferably 40-80 mm, preferably 50-70 mm, or about 60 mm, as well as equivalent width ranging from 5-50 mm, preferably 10-40 mm, preferably 15-30 mm, or about 25 mm. Alternatively, the cross sections of the first and second rectangular side indentations have different lengths and/or widths.

In one or more embodiments, the length of each of the first and second rectangular side indentations ($L_3$) are 10-20%, preferably 12-18%, preferably 14-16% relative to that of the rectangular cross section of the masonry hollow brick (L). The length of each of the rectangular cross sections of the first and second outer central cavities ($L_1$) are 75-95%, preferably 80-92%, preferably 82-90%, preferably 84-88% relative to that of the masonry hollow brick (L). The length of the rectangular cross section of the inner central cavity ($L_2$) is 40-70%, preferably 45-65%, preferably 50-60%, preferably 54-58% relative to that of the masonry hollow brick (L).

In some embodiments, the masonry hollow brick 10 has a lateral thickness ($L_4$) of 15-50 mm, preferably 20-40 mm, preferably 25-30 mm, or about 28 mm and a longitudinal thickness ($W_2$) of 20-60 mm, preferably 25-50 mm, preferably 30-40 mm, or about 35 mm.

An aspect ratio of a cavity is generally the ratio of the length of the cavity perpendicular to heat flow relative to the height of the cavity. As used herein, an aspect ratio is determined by comparing the lengths of the rectangular cross sections of the cavities or the lengths of rectangular side indentations to the height (H) of the substantially rectangular cuboid shape of the masonry hollow brick. In one or more embodiments, the first and second outer central cavities have an aspect ratio of 1.0-3.0, preferably 1.5-2.5, more preferably 1.7-2.2, the inner central cavity has an aspect ratio of 0.5-2.0, preferably 0.8-1.5, more preferably 1-1.4, and the first and second rectangular side indentations have an aspect ratio of 0.1-0.5, preferably 0.2-0.4. A hollow ratio is area of cavities per cross area of a brick. As used herein, a hollow ratio is determined by comparing the total cross-sectional area of cavities and indentations to the net cross-sectional area of the masonry hollow brick in a plane parallel to the load-bearing surface, e.g. surfaces 20 and 22. In one or more embodiments, the masonry hollow brick has a hollow ratio of 20%-40%, preferably 25%-35%, preferably 29%-32%. According to Section 2102 of the International Building Code, a masonry brick is generally defined as "hollow" when the net cross-sectional area is less than 75% of the gross cross-sectional area in a plane parallel to the load-bearing surface.

In one or more embodiments, the masonry hollow brick described herein has a compressive strength of 3.0-5.0 MPa, preferably 3.1-4.8 MPa, preferably 3.2-4.6 MPa, preferably 3.3-4.4 MPa, preferably 3.4-4.2 MPa, preferably 3.6-4.0 MPa. In one embodiment, the compressive strength of the masonry hollow brick is determined by ASTM C 140. As defined herein, compressive strength is the capacity of a material or structure to withstand compressive loads, as opposed to tensile strength, which is the capacity of a material or structure to withstand tensile loads. In certain embodiments where polyethylene is used as the insulating material, the compressive strength of the masonry hollow brick may be at least 5%, preferably at least 8%, preferably at least 10% greater than that of the masonry hollow brick where perlite and/or crumb rubber is used as the insulating material.

In one or more embodiments, the masonry hollow brick has a dry density of 1100-1700 kg/m$^3$, preferably 1200-1600 kg/m$^3$, preferably 1300-1500 kg/m$^3$, preferably 1350-1400 kg/m$^3$. In certain embodiments where perlite is used as the insulating material, the dry density of the masonry hollow brick may be at least 8%, preferably at least 15%, preferably at least 20% smaller than that of the masonry hollow brick where polyethylene and/or crumb rubber is used as the insulating material.

In one embodiment, the masonry hollow brick described herein has a weight of 8-25 kg, preferably 10-20 kg, preferably 12-18 kg, preferably 14-16 kg.

In one or more embodiments, the masonry hollow brick has a water absorption of 80-200 kg/m$^3$, preferably 100-190 kg/m$^3$, preferably 120-170 kg/m$^3$, preferably 140-160 kg/m$^3$. In one embodiment, the water adsorption of the masonry hollow brick is determined by ASTM C140. In certain embodiments where polyethylene is used as the insulating material, the water absorption of the masonry hollow brick may be at least 15%, preferably at least 30%, preferably at least 50% smaller than that of the masonry hollow brick where perlite and/or crumb rubber is used as the insulating material.

In one or more embodiments, the masonry hollow brick has a thermal conductivity of 0.2-0.45 W/m·K, preferably 0.3-0.4 W/m·K, preferably 0.32-0.38 W/m·K, preferably 0.34-0.36 W/m·K as determined by ASTM C 177-85. As defined herein, thermal conductivity is a property of a material to conduct heat or alternatively the ability of a material to absorb heat. It can also be defined as the quantity of heat transmitted through a unit thickness of a material due to a unit temperature or the ratio between the heat flux and the temperature gradient. The SI units for thermal conductivity is measured in watts per meter kelvin (W/m·K). Conventional masonry bricks have a thermal conductivity of about 0.58 W/m·K, and therefore the masonry hollow bricks of the present disclosure have a lower thermal conductivity (i.e. about 20-70% lower), which may provide energy conservation in buildings employing the masonry hollow bricks. In certain embodiments where perlite is used as the insulating material, the thermal conductivity of the masonry hollow brick may be at least 20%, preferably at least 25% smaller than that of the masonry hollow brick where polyethylene and/or crumb rubber is used as the insulating material.

The examples below are intended to further illustrate protocols for designing, manufacturing and characterizing the masonry hollow brick, and are not intended to limit the scope of the claims.

EXAMPLE 1

Compositions of Masonry Hollow Bricks [or: Insulation Lightweight Hollow Bricks (ILHBs)]

As shown in Table 1, three insulation lightweight hollow bricks are presented, including: (i) crushed tires rubber hollow bricks (CTRHB), (ii) high-density polyethylene hollow bricks (HDPEHB), and (iii) graded perlite hollow bricks (GPLHB).

For CTRHB and HDPEHB, coarse aggregates (⅜ and 3/16 in) were partially replaced with the same sizes of coarse particles of crushed tire rubber (CTR) and high density polyethylene (HDPE) at 20% by weight. As for GPLHB, fine aggregate (e.g. sand) was partially replaced by perlite at 30% by weight. These lightweight insulation hollow bricks are designed to minimize thermal flow to the interior surface as a result of the selected compositions (Table 1). The contents of the insulation materials were optimized in order to satisfy required strength set by ASTM C 129.

TABLE 1

Mix proportions of ILHBs

| Materials | Weight (kg/m³) | | | Volume (%) | | |
|---|---|---|---|---|---|---|
| | GPL | HDPE | CTR | GPL | HDPE | CTR |
| Cement content | 325 | 250 | 225 | 10.32 | 7.14 | 7.94 |
| Water content | 271 | 135 | 124 | 27.11 | 123.9 | 13.52 |
| w/c ratio | 0.495 | 0.495 | 0.495 | 0.495 | 0.495 | 0.495 |
| CA (⅜) in | 397 | 638 | 696 | 15.27 | 26.78 | 24.52 |
| CA (3/16) in | 119 | 190 | 208 | 4.56 | 8.00 | 7.33 |
| Replacement (⅜) in | 103 | 159 | 174 | 34.37 | 15.54 | 17.33 |
| Replacement (3/16) in | | 48 | 52 | | 4.64 | 5.18 |
| Sand | 241 | 393 | 429 | 9.40 | 16.75 | 15.34 |
| CA/TA | 0.60 | 0.725 | 0.725 | 0.60 | 0.725 | 0.725 |
| FA/TA | 0.40 | 0.275 | 0.275 | 0.40 | 0.275 | 0.275 |
| SP (Liter) | 4.30 | 1.5 | 1.4 | 0.361 | 0.117 | 0.122 | w/c: water/cement weight ratio;
CA: coarse aggregate;
TA: total aggregates;
SP: superplasticizer.

EXAMPLE 2

Equivalent Thermal Conductivity of Masonry Hollow Bricks [or: Insulation Lightweight Hollow Bricks (ILHBs)]

Masonry hollow bricks were developed by replacing fine and coarse aggregates with insulation materials. The presently described masonry hollow bricks are demonstrated for use in exterior walls to reduce the heat flow to the interior surfaces with a thermal efficiency exceeding 100%, as compared to the market hollow masonry bricks. The experimental results of equivalent thermal conductivity are 0.309, 0.387 and 0.404 W/m·k, respectively, for the developed masonry hollow bricks having graded perlite (GPL), high density polyethylene (HDPE), and crushed tires rubber (CTR) as the insulating material (Table 2). As compared to clay and polystyrene masonry bricks, the improvement in the equivalent thermal conductivity for graded perlite hollow bricks (GPLHB) reached 60%, while the improvement reached 40% for high-density polyethylene hollow bricks (HDPEHB) and crushed tires rubber hollow bricks (CTRHB).

TABLE 2

Equivalent thermal conductivity of ILHBs

| Insulation Lightweight Hollow Bricks | ID (ILHBs) | Equivalent thermal conductivity (W/m · k) |
|---|---|---|
| Graded Perlite Hollow Brick | GPLHB | 0.309 |
| High Density Polyethylene Hollow Brick | HDPEHB | 0.387 |
| Crushed Tire Rubber Hollow Bricks | CTRHB | 0.404 |

Improvements in the equivalent thermal conductivity were determined to be 33%, 16% and 12%, when comparing hollow bricks using perlite, polyethylene, and rubber as insulating material to the control hollow brick having the same geometry but without insulating material. The design of the presently disclosed masonry hollow brick (only geometry, without considering any specific material) has enhanced the thermal efficiency by about 70% compared to the hollow bricks in the market.

The equivalent thermal conductivity of ILHBs was measured using the Guarded Hot Plate Instrument according to ASTM C 177-85. The samples were prepared by closing the cavities with tape to prevent air escaping and heat losing before measurement. The thermocouples were fixed on both faces of the bricks to measure the surface temperature. The results of the thermal test indicate that equivalent thermal conductivities of ILHBs were 0.309, 0.387, and 0.404 W/m·k for GPLHB, HDPEHB and CTRHB, respectively.

The improvement in the thermal efficiency of ILHBs was significant comparing to other insulation hollow bricks with different materials. The equivalent thermal conductivity of GPLHB is the smallest among the three ILHBs, which is 20% and 24% less than HDPEHB and CTRHB, respectively, and 50-60% less than perlite, polystyrene and clay (red) hollow bricks tested by many researchers. An enhancement of thermal insulation of rubber (CTRHB) and polyethylene (HDPEHB) hollow bricks relative to that of hollow bricks including vermiculite, polystyrene and clay bricks reached 50%. A biggest reduction in equivalent thermal conductivity for ILHBs reached 80% by comparing to normal hollow concrete masonry bricks, which are ones of the most widely used in the market because of their low cost.

EXAMPLE 3

Evaluation of Masonry Hollow Bricks [or: Insulation Lightweight Hollow Bricks (ILHBs)]

As shown in Table 3, the present disclosure includes detailed evaluation of the developed masonry hollow bricks (insulation lightweight masonry bricks). The results of property evaluation experiments (e.g. compressive strength, dry density, water adsorption) satisfied the ASTM C 129 standard set for non-load bearing masonry bricks (Table 3). Further, accordingly to ASTM C 129, these developed insulation hollow bricks are considered lightweight masonry bricks (Table 3). The graded perlite hollow bricks (GPLHB) achieved a weight of 11.34 kg. By comparing with the control brick, a reduction in weight of graded perlite hollow brick (GPLHB), high-density polyethylene hollow brick (HDPEHB) and crushed tires rubber hollow brick (CTRHB) was determined to be 42%, 19%, and 14%, respectively.

TABLE 3

Property evaluation of ILHBs

| (ILHBs) | Compressive Strength (MPa) | Weight (kg) | Dry density (kg/m$^3$) | Water absorption (kg/m$^3$) |
|---|---|---|---|---|
| GPHB | 3.50 | 11.34 | 1349.20 | 187.60 |
| HDPEHB | 3.84 | 15.80 | 1508.90 | 99.53 |
| CTRHB | 3.61 | 16.84 | 1635.60 | 117.73 |

The insulation lightweight hollow bricks (ILHBs) were tested for their compressive strength, water absorption and thermal conductivity. The tests of compressive strength and water absorption were conducted according to ASTM C 140 standard. The compressive strengths of ILHBs are 3.50, 3.61 and 3.84 MPa for GPLHB, CTRHB and HDPEHB, respectively, which meet the ASTM C 129 standard for non-load bearing masonry bricks. The three insulation hollow bricks having a dry density of 1349.2, 1635.6 and 1508.9 kg/m$^3$ are considered as lightweight masonry units according to ASTM C-129. The hollow bricks were capped with cement mortar before testing according to ASTM C 1552. The water absorptions for ILHBs are 187.6, 117.73 and 99.53 kg/m$^3$ for GPLHB, CTRHB and HDPEHB hollow bricks, respectively, which are all below the maximum water absorption allowable in the ASTM C 129 standard for lightweight masonry bricks (1680 kg/m$^3$).

The polyethylene used as the insulating material of the present disclosure may further contain other polymers such as polypropylene (PP), polyamide (PA), polyvinyl chloride (PVC) and acrylic-alkyd resin with their weight percentages listed in Table 4.

TABLE 4

Weight percentages of different polymers

| Materials | Water | Inorganic fillers | PE | PP | PA | Alkyd/acrylic | PVC |
|---|---|---|---|---|---|---|---|
| Weight % | 0.14 | 3.22 | 81.30 | 9.50 | 1.32 | 4.03 | 0.48 |

EXAMPLE 4

Benefits of Masonry Hollow Brick

In view of the foregoing, the addition of new insulation materials to masonry hollow bricks leads to their increased overall thermal resistance and reduced weight. The present disclosure includes descriptions of materials and their mixing proportions useful for preparing the masonry hollow brick. As compared to market hollow bricks, the disclosed lightweight insulation hollow bricks have shown a reduced weight and thermal conductivity by 50% and 100%, respectively. Further, the equivalent thermal conductivity of the developed ILHBs were 0.309, 0.387 and 0.404 W/m·k, which have an improvement reached to 100% as compared to market hollow bricks and other hollow bricks tested in Saudi Arabia and Oman. Thus, the newly disclosed masonry hollow bricks are not only lightweight for building light structures but also thermally efficient for saving energy.

The invention claimed is:

1. A masonry hollow brick of a substantially rectangular cuboid shape with a top surface and a bottom surface, comprising:
   first and second outer central cavities having rectangular cross sections parallel to a rectangular cross section of the masonry hollow brick;
   an inner central cavity having a rectangular cross section that is disposed between and parallel with the first and second outer central cavities; and
   first and second rectangular side indentations having cross sections extending from a sidewall of the masonry hollow brick toward the inner central cavity;
   wherein:
   the top surface and the bottom surface are flat;
   the inner central cavity and the first or the second side indentations are not continuous;
   the first and second outer central cavities, the inner central cavity, and the first and second side indentations are continuous along a direction perpendicular to the cross section of the masonry hollow brick; and
   the length of each of the first and second rectangular side indentations is 12-18% relative to that of the rectangular cross section of the masonry hollow brick;
   the length of each of the rectangular cross sections of the first and second outer central cavities is 82-90% relative to that of the masonry hollow brick;
   the length of the rectangular cross section of the inner central cavity is 45-65% relative to that of the masonry hollow brick;
   the first and second outer central cavities and the inner central cavity are the only cavities present in the masonry hollow brick; and
   the masonry hollow brick is a cured form of a concrete composition comprising:
   cement;
   water;
   sand;
   an insulating material which is at least one selected from the group consisting of a perlite, a polyethylene, and a crumb rubber; and
   a coarse aggregate, which is not the insulating material.

2. The masonry hollow brick of claim 1, which has a thermal conductivity of 0.2-0.45 W/m·K as determined by ASTM C 177-85.

3. The masonry hollow brick of claim 1, which has a longitudinal thickness greater than widths of the first and second outer central cavities.

4. The masonry hollow brick of claim 1, wherein:
   the first and second outer central cavities have an aspect ratio of 1.7-2.2;
   the inner central cavity has an aspect ratio of 1-1.4;
   the first and second rectangular side indentations have an aspect ratio of 0.1-0.5; and
   the masonry hollow brick has a hollow ratio of 20%-40%;
   wherein each aspect ratio is determined by comparing the lengths of the rectangular cross sections of the cavities or the lengths of rectangular side indentations to a height of the substantially rectangular cuboid shape of the masonry hollow brick.

5. The masonry hollow brick of claim 1, wherein the concrete composition comprises:
- 10-25 wt % of the cement;
- 5-20 wt % of the water;
- 14-25 wt % of the sand;
- 5-15 wt % of the insulating material; and
- 30-50 wt % of the coarse aggregate relative to a total weight of the concrete composition.

6. The masonry hollow brick of claim 1, wherein the coarse aggregate has a particle size of 3-12 mm.

7. The masonry hollow brick of claim 1, wherein the perlite is present as the insulating material, and wherein the perlite is in the form of fine particles having a particle size of 0.1-6 mm.

8. The masonry hollow brick of claim 1, wherein the polyethylene is present as the insulating material, and wherein the polyethylene is in the form of coarse particles having a particle size of 3-12 mm.

9. The masonry hollow brick of claim 8, wherein the polyethylene is a high density polyethylene.

10. The masonry hollow brick of claim 1, wherein the crumb rubber is present as the insulating material, and wherein the crumb rubber is in the form of coarse particles having a particle size of 3-12 mm.

11. The masonry hollow brick of claim 7, wherein a weight ratio of the sand to the perlite ranges from 2:1 to 4:1.

12. The masonry hollow brick of claim 8, wherein a weight ratio of the coarse aggregate to the polyethylene ranges from 3:1 to 5:1.

13. The masonry hollow brick of claim 10, wherein a weight ratio of the coarse aggregate to the crumb rubber ranges from 3:1 to 5:1.

14. The masonry hollow brick of claim 1, wherein the coarse aggregate has a specific gravity of 2-3.

15. The masonry hollow brick of claim 1, wherein the concrete composition further comprises a superplasticizer.

16. The masonry hollow brick of claim 1, which has a water absorption of 80-200 kg/m$^3$ as determined by ASTM C140.

17. The masonry hollow brick of claim 1, which has a compressive strength of 3.0-4.0 MPa as determined by ASTM C 140.

18. The masonry hollow brick of claim 1, which has a dry density of 1100-1700 kg/m$^3$.

* * * * *